(12) United States Patent
Cheng (10) Patent No.: US 9,044,871 B2
(45) Date of Patent: Jun. 2, 2015

(54) ADJUSTABLE WORKING AREA CUTTING MACHINE

(75) Inventor: Chih-Ming Cheng, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 162 days.

(21) Appl. No.: 13/333,080

(22) Filed: Dec. 21, 2011

(65) Prior Publication Data

US 2012/0160070 A1 Jun. 28, 2012

(30) Foreign Application Priority Data

Dec. 28, 2010 (TW) ................................ 99146295 A (51) Int. Cl.
| | |
|---|---|
| B27B 27/10 | (2006.01) |
| B26D 7/01 | (2006.01) |
| B23D 47/02 | (2006.01) |
| B27B 27/02 | (2006.01) |
| B26D 1/14 | (2006.01) |

(52) U.S. Cl.
CPC . *B26D 7/01* (2013.01); *B27B 27/10* (2013.01); *B26D 1/14* (2013.01); *B23D 47/025* (2013.01); *B27B 27/02* (2013.01)

(58) Field of Classification Search
USPC .......... 83/438–468.94, 487–490, 477.2, 581; 144/253.6, 253.5, 253.1, 286.1, 287
See application file for complete search history.

(56) References Cited

U.S. PATENT DOCUMENTS

| | | | | |
|---|---|---|---|---|
| 4,658,687 | A * | 4/1987 | Haas et al. ...................... | 83/438 |
| 5,954,106 | A * | 9/1999 | Huang ...................... | 144/286.5 |
| 6,189,429 | B1 * | 2/2001 | Liu .................................. | 83/477 |
| 6,357,328 | B1 * | 3/2002 | Ceroll et al. .................. | 83/477.2 |
| 6,360,641 | B1 * | 3/2002 | Talesky et al. .................. | 83/438 |
| 6,786,122 | B2 * | 9/2004 | Svetlik ............................ | 83/468 |
| 7,036,414 | B2 * | 5/2006 | Behne et al. ................. | 83/468.7 |
| 7,174,820 | B2 * | 2/2007 | Huang ............................ | 83/446 |
| 7,438,098 | B2 * | 10/2008 | Liu et al. .................... | 144/286.5 |
| 7,490,643 | B2 * | 2/2009 | Liu et al. .................... | 144/286.5 |

(Continued)

FOREIGN PATENT DOCUMENTS

| | | |
|---|---|---|
| CN | 101036993 A | 9/2007 |
| CN | 201455350 U | 5/2010 |
| CN | 201565595 U | 9/2010 |
| TW | 405469 U | 9/2000 |
| TW | 522066 B | 3/2003 |

OTHER PUBLICATIONS

Taiwanese Office Action dated May 18, 2013, for TW 099146295, and English translation thereof.
Taiwanese Office Action dated Jan. 7, 2014, for TW 099146295, and English translation thereof.
Chinese Office Action dated Dec. 25, 2013, for CN 201110037795.X, and English translation thereof.

*Primary Examiner* — Omar Flores Sanchez
(74) *Attorney, Agent, or Firm* — Bacon & Thomas, PLLC (57) ABSTRACT

An adjustable working area cutting machine includes a worktable, a cutting unit, a movable guide rail unit, a fence unit, and a locking unit installed on one of the worktable and the movable guide rail unit. The worktable includes a first rail. The movable guide rail unit includes a channel bar coupled to the first rail, and a second rail. The locking unit is fixed to the other of the worktable and the movable guide rail unit. The fence unit includes a fence arranged to be located on the top side of the worktable, and a slide coupled to the second rail. By moving the movable guide rail unit relative to the worktable, the working area of the cutting machine is relatively extended. To cut a large size workpiece, the position of the movable guide rail unit is adjusted relative to the worktable to extend the working area.

23 Claims, 6 Drawing Sheets

(56) References Cited

U.S. PATENT DOCUMENTS

| | | | |
|---|---|---|---|
| 8,312,799 B2 * | 11/2012 | Frolov | 83/438 |
| 2002/0092397 A1 | 7/2002 | Liu | |
| 2006/0144203 A1 | 7/2006 | Behne et al. | |
| 2008/0284081 A1 * | 11/2008 | Smith | 269/74 |
| 2009/0277315 A1 | 11/2009 | Ipatenco et al. | |
| 2010/0043614 A1 | 2/2010 | Gehret et al. | |
| 2010/0071521 A1 * | 3/2010 | Hadaway et al. | 83/76.1 |
| 2011/0048201 A1 * | 3/2011 | Frolov | 83/446 |
| 2011/0061508 A1 * | 3/2011 | Scherl | 83/438 |

* cited by examiner

ADJUSTABLE WORKING AREA CUTTING MACHINE

This application claims, under 35 U.S.C. §119, priority to Taiwanese Application No. 099146295, filed Dec. 28, 2010, which application is hereby incorporated by reference in its entirety, inclusive of the specification, claims, and drawings.

FIELD OF THE INVENTION

The present disclosure relates to cutting machines and more specifically, to a working area adjustable cutting machine.

BACKGROUND

A conventional cutting machine, as disclosed in U.S. Patent Application Publication No. US 2009/0277315 A1, generally includes a worktable, a cutting unit, a rail located on one lateral side of the worktable, and a fence movable along the rail.

When cutting a workpiece, one side of the workpiece is placed in contacted with the fence and the workpiece is then moved along the fence toward the cutting unit for cutting. In order to cut a different sized workpiece, the fence is moved along the rail to adjust the distance between the fence and the cutting unit. By means of adjusting the position of the fence relative to the cutting unit, the cutting machine meets different cutting requirements for cutting different sized workpieces.

However, when cutting a large size workpiece, the fence may be unable to support the workpiece in position even it is adjusted to the outermost end of the rail. As it is the current market trend to develop compact and small size cutting machines, extending the size of the worktable in order to accommodate a larger rail, and thus larger sized workpieces, does not meet current market requirements. Therefore, there is a strong demand for a cutting machine, which allows adjustment of the working area to accommodate different cutting requirements.

SUMMARY

In view of the above, it is therefore one object of the present disclosure to provide an adjustable working area cutting machine, which is adjustable to extend the cutting area to accommodate larger sized workpieces.

To achieve this and other objects, an adjustable working area cutting machine according to the present disclosure includes a worktable, a cutting unit, a movable guide rail unit, a fence unit, and a locking member. The worktable includes a first rail located on one lateral side thereof perpendicularly facing the cutting unit. The cutting unit is mounted to the worktable. The movable guide rail unit is mounted to the first rail of the worktable, and includes a channel bar coupled to the first rail and a second rail joined to one side of the channel bar and arranged in a parallel manner relative to the first rail. The fence unit includes a fence arranged to be positioned at the top surface of the worktable, and a guide block configured to be connected to the second rail. The locking member is selectively mounted to the first rail or the channel bar of the movable guide rail unit, and is adapted for engaging the first rail or the channel bar of the movable guide rail unit to lock the movable guide rail unit to the first rail.

By means of moving the movable guide rail unit relative to the worktable, the working area of the cutting machine is relatively extended. In order to cut a large size workpiece, the position of the movable guide rail unit is adjusted relative to the worktable to extend the working area, thus satisfying the cutting requirement for the large size workpiece.

Other advantages and features of the present disclosure will be fully understood by reference to the following specification in conjunction with the accompanying drawings, in which like reference signs denote like components of structure.

DETAILED DESCRIPTION

Figure 1:
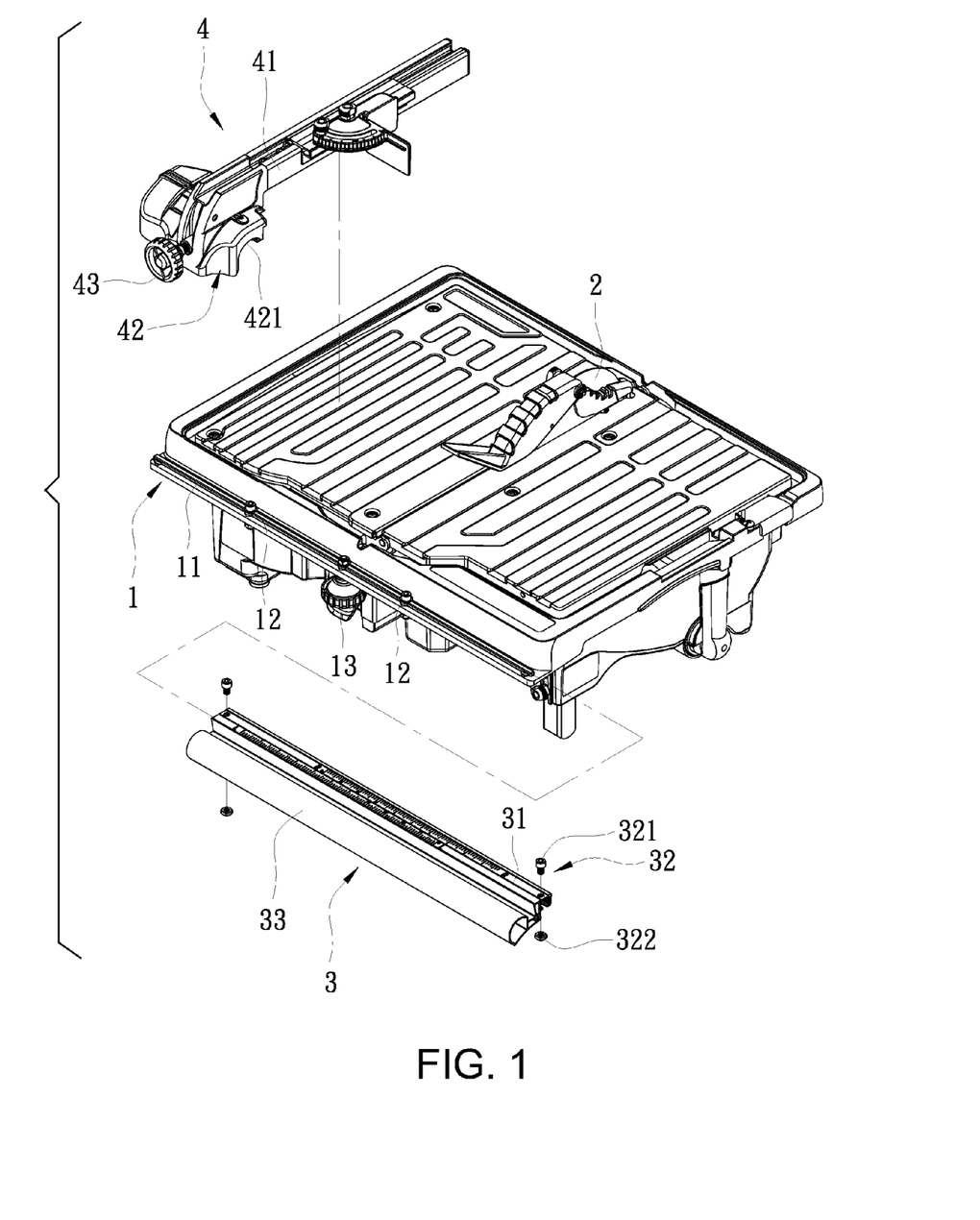
FIG. 1 is an exploded view of an adjustable working area cutting machine in accordance with the present disclosure.
Figure 2:
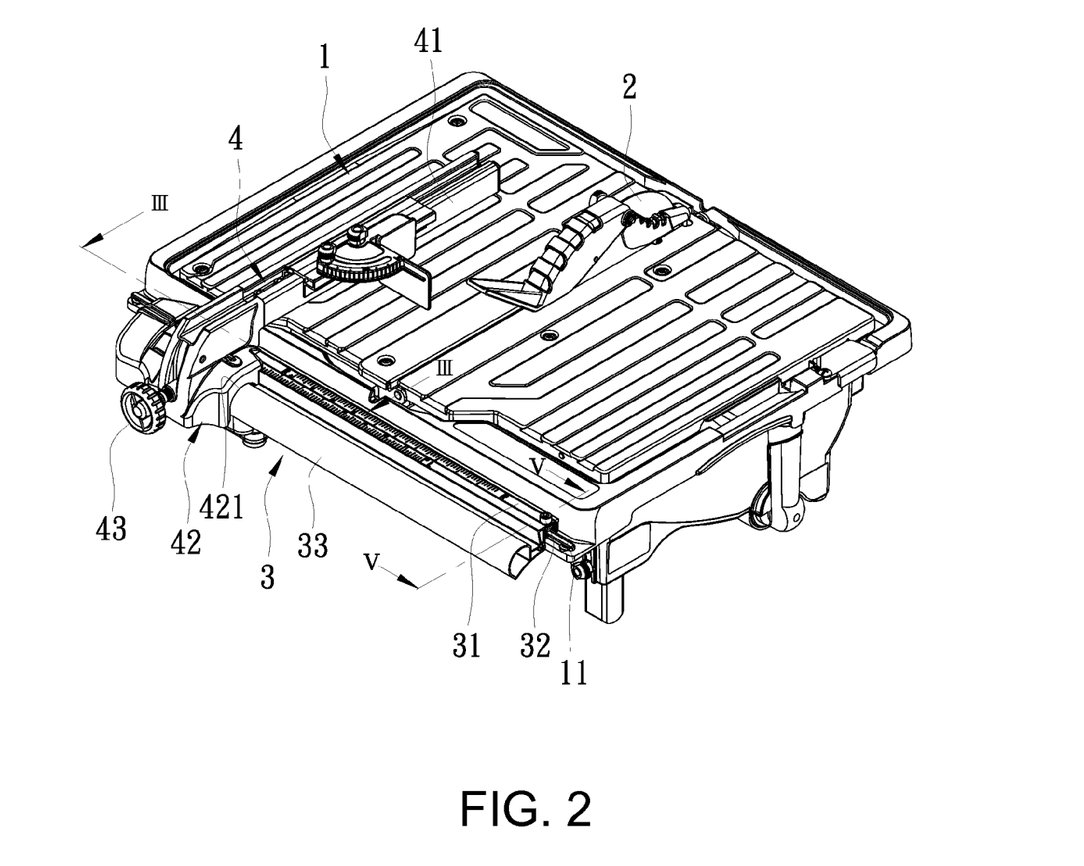
FIG. 2 is assembly perspective view of the adjustable working area cutting machine in accordance with the present disclosure.
Figure 3:
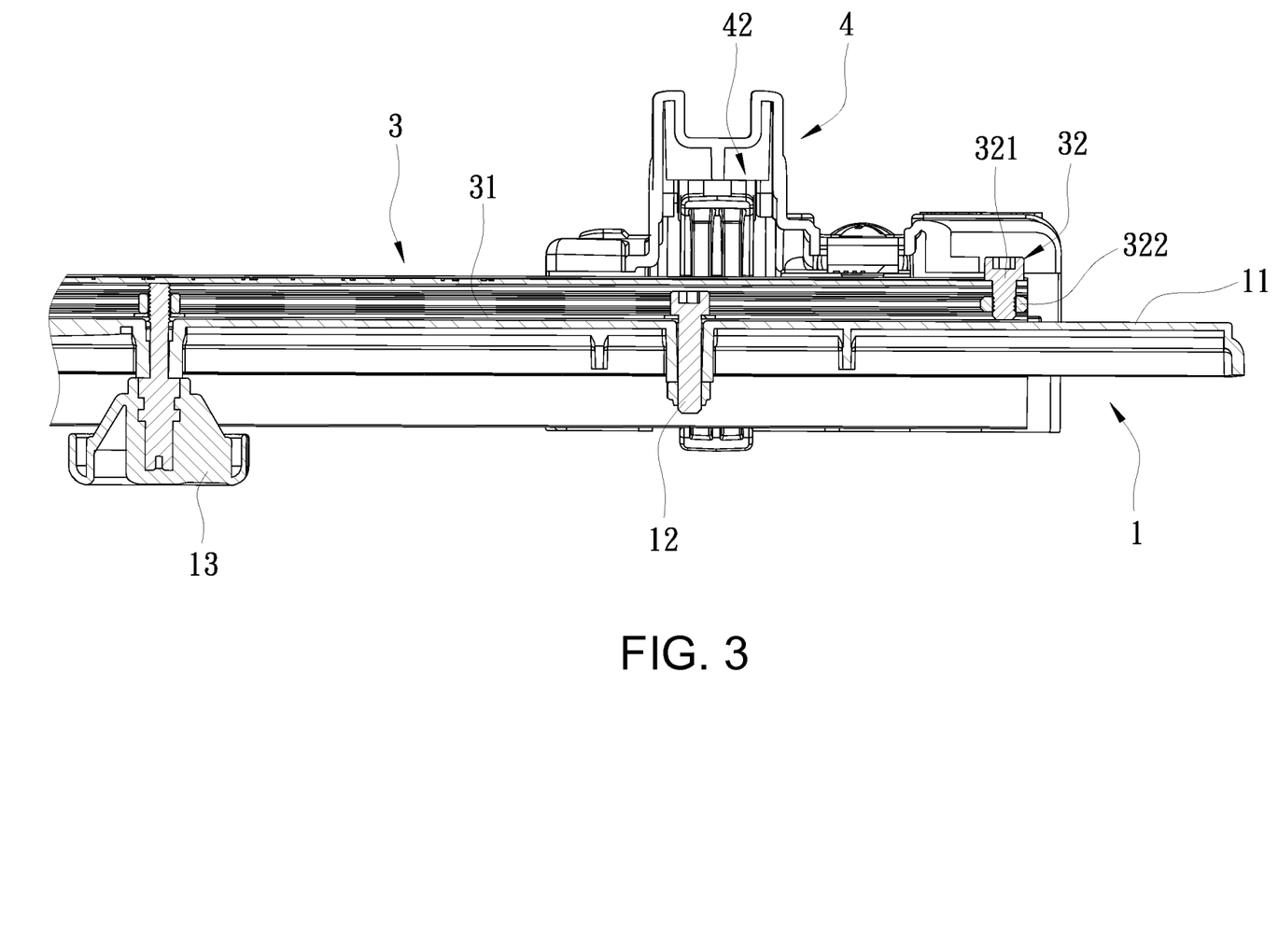
FIG. 3 is a sectional view taken along line III-III of FIG. 2, illustrating the relationship between the first rail of the worktable and the channel bar of the movable guide rail unit.

Referring to FIGS. 1, 2 and 3, the disclosure provides an adjustable working area cutting machine, which includes a worktable 1, a cutting unit 2, a movable guide rail unit 3, and a fence unit 4.

The worktable 1 includes a first rail 11 located on one lateral side thereof perpendicularly facing the cutting unit 2. The first rail 11 protrudes upwards. The worktable 1 further includes two stop bolts 12 mounted to the first rail 11 and extending upwardly and positioned in a channel bar 31 of the movable guide rail unit 3. The worktable 1 also has a locking member 13 mounted to the first rail 11.

The cutting unit 2 is mounted to the worktable 1.

Figure 5:
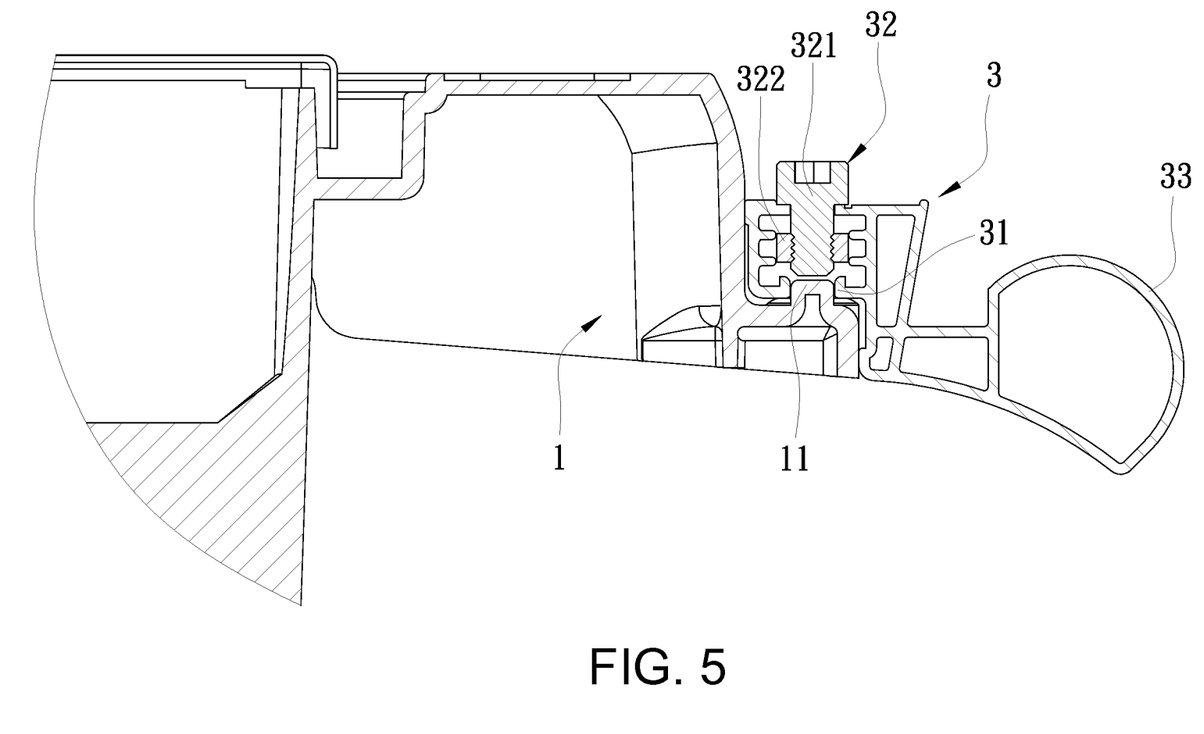
FIG. 5 is a sectional view taken along line V-V of FIG. 2, illustrating the relationship between one limiter of the movable guide rail unit and the first rail.

Referring also to FIG. 5, the movable guide rail unit 3 is mounted to the first rail 11 of the worktable 1. The movable guide rail unit 3 includes a channel bar 31 coupled to the first rail 11, two limiters 32 respectively disposed at two distal ends of the channel bar 31, and a second rail 33 arranged in a parallel manner relative to the first rail 11. The locking member 13 is configured to project upwardly to selectively engage the channel bar 31. The channel bar 31 has a length shorter than the length of the first rail 11.

Each limiter 32 includes a screw bolt 321, and a nut 322 which is disposed in the channel bar 31 and is threaded onto the screw bolt 321. The limiters 32 are respectively limited by selective engagement with the stop bolts 12.

Figure 4:
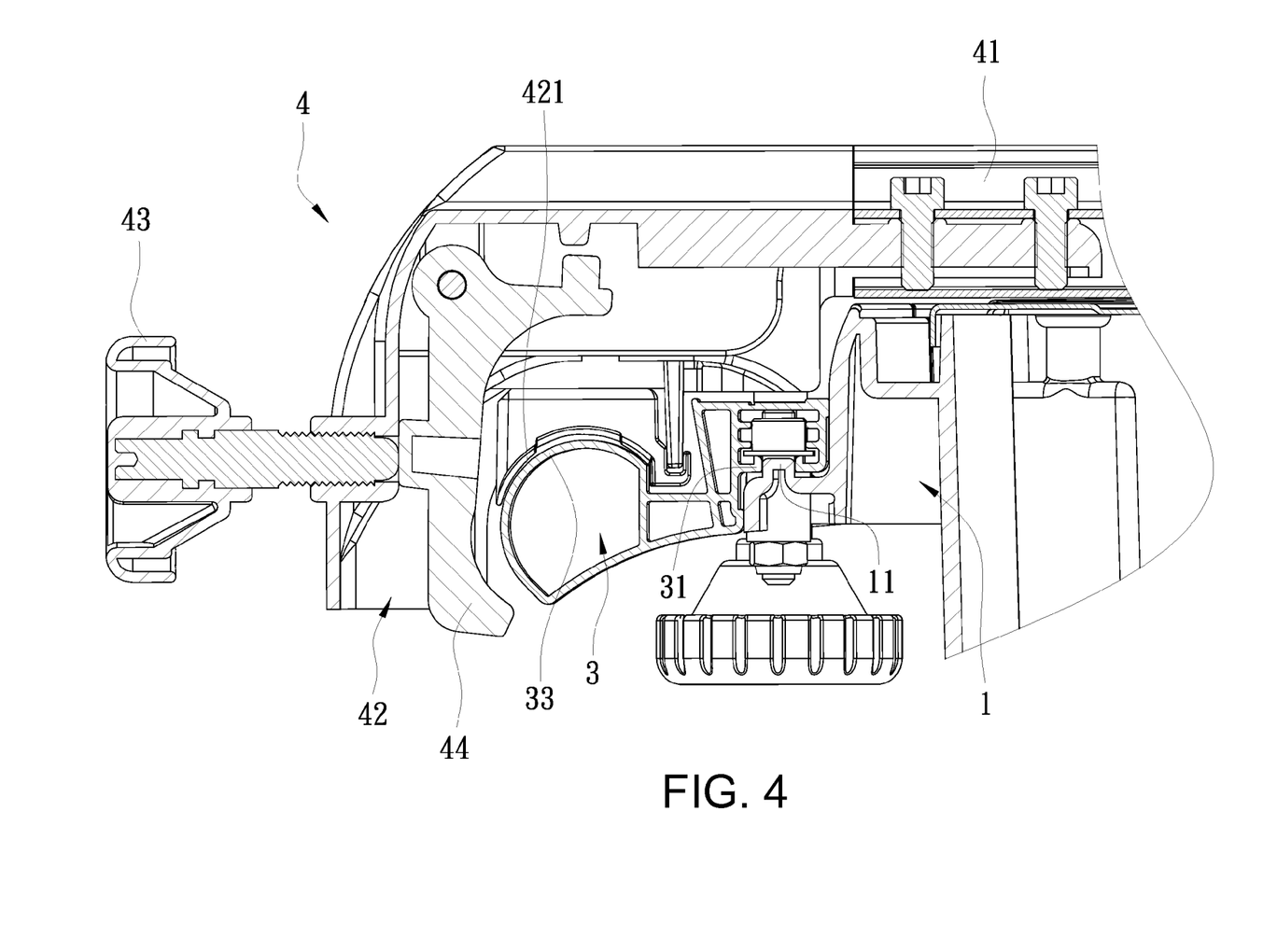
FIG. 4 is a sectional view of the adjustable working area cutting machine of the present disclosure, illustrating the relationship between the movable guide rail unit and the fence unit.

Referring also to FIG. 4, the fence unit 4 includes a fence 41 arranged to be positioned at a top surface of the worktable 1, a guide block 42 disposed on the fence 41 and selectively movably engaged with the second rail 33, a hand wheel 43 mounted to the guide block 42, and a locking block 44 pivotally connected to the guide block 42 and driven by the hand wheel 43 for selectively locking the fence 41 to the second rail 33.

The guide block 42 has a guide groove 421 corresponding in shape to the second rail 33. When the fence unit 4 is positioned relative to the movable guide rail unit 3, the hand wheel 43 can be rotated inwardly to drive the locking block 44 to engage the second rail 33, thereby securely locking the fence unit 4 in position.

Further, the two stop bolts 12 are adapted to limit a moving range of the movable guide rail unit 3, avoiding over displacement of the movable guide rail unit 3 that may lead to the movable guide rail unit 3 becoming disengaged from the worktable 1. Further, the locking member 13 is a hand wheel adapted for locking the movable guide rail unit 3 to the worktable 1.

Alternatively, the locking member 13 can be mounted to the movable guide rail unit 3 and downwardly abut against the first rail 11 of the worktable 1, locking the movable guide rail unit 3 to the worktable 1.

Further, the limiters 32 can also be mounted to the first rail 11 of the worktable 1, i.e., the mounting positions between the limiters 32 and the stop bolts 12 can be exchanged, the same effect can be achieved.

Figure 6:
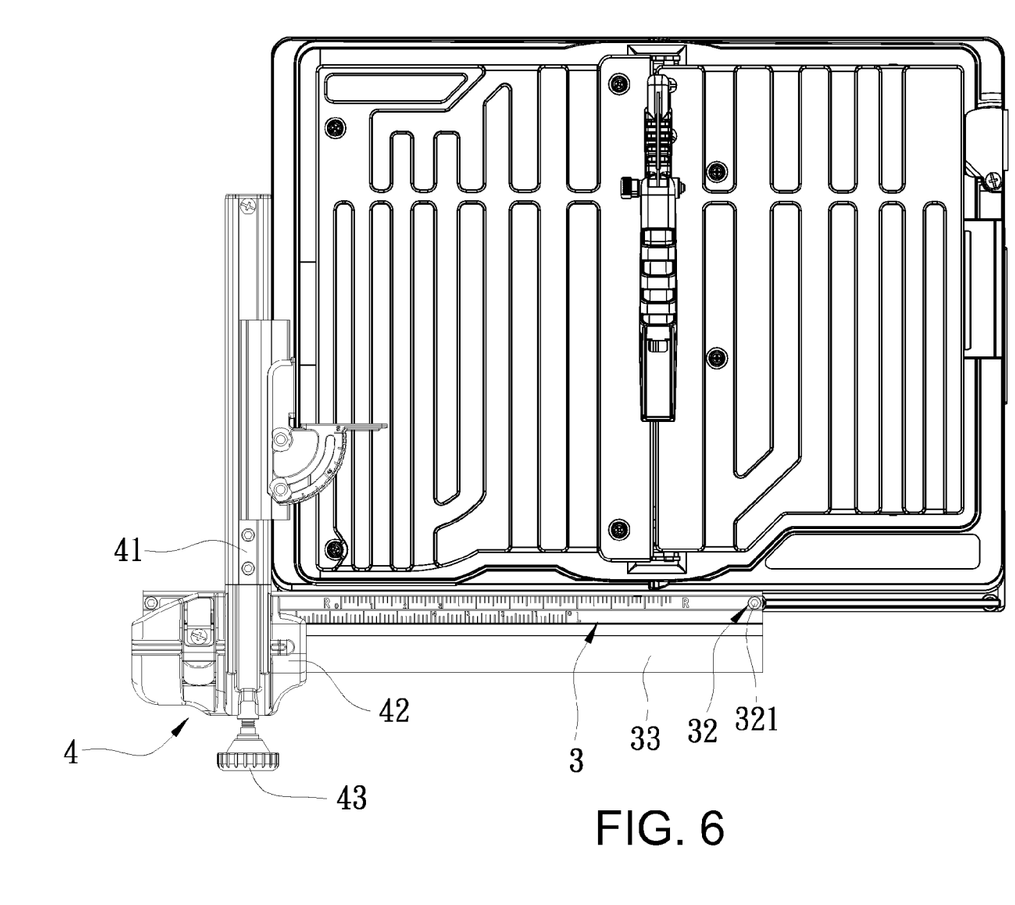
FIG. 6 is a schematic top view of the adjustable working area cutting machine of the present disclosure, illustrating the fence unit extended to the left limit position.

Referring to FIG. 2 and FIG. 6, to perform cutting of a regular sized workpiece, the movable guide rail unit 3 is arranged such that is located at a middle part of the worktable 1 and the locking member 13 is operated to lock the channel bar 31 of the movable guide rail unit 3 to the first rail 11 of the worktable 1.

In order to cut a large size workpiece, the locking member 13 is loosened, and then the movable guide rail unit 3 is moved outwardly relative to the first rail 11 away from the cutting unit 2. For example, as shown in FIG. 6, the movable guide rail unit 3 is moved toward a left side relative to the first rail 11 until the screw bolt 321 of the right side limiter 32 engages one stop bolt 12, and then the locking member 13 is fastened tight to lock the movable guide rail unit 3 to the worktable 1 in the adjusted position. At this time, the operator can further move the fence unit 4 leftwards, by manipulating the hand wheel 43 in order disengaged the locking block 44 from the second rail 33 in order to extend the working area of the worktable 1, thus satisfying the cutting requirement for the large size workpiece.

In conclusion, by means of moving the movable guide rail unit 3 relative to the worktable 1, the working area is extended. Thus, when cutting a large size workpiece, the operator can adjust the position of the movable guide rail unit relative to the worktable to extend the working area, satisfying the cutting requirement for the large size workpiece.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An adjustable working area cutting machine, comprising:
   a worktable having a first rail located on one lateral side thereof;
   a movable guide rail unit mounted to said first rail of said worktable, and having a channel bar coupled to said first rail and a second rail joined to one side of said channel bar and arranged in a parallel manner relative to said first rail;
   a fence unit having a fence arranged to be positioned at a top surface of said worktable and a guide block selectively movably engaged with said second rail; and
   a locking member mounted to said first rail or to said channel bar of said movable guide rail unit and adapted for selectively engaging said channel bar of said movable guide rail unit or said first rail to selectively lock said movable guide rail unit to said first rail;
   wherein said locking member is mounted to said first rail and extends upwardly for selective engagement with said channel bar; and
   wherein said channel bar has a length shorter than a length of said first rail.

2. The adjustable working area cutting machine according to claim 1, further comprising two limiters mounted to said channel bar or to said first rail for limiting a moving range of said movable guide rail unit relative to said first rail.

3. The adjustable working area cutting machine according to claim 2, wherein said two limiters are respectively mounted at two distal ends of said channel bar.

4. The adjustable working area cutting machine according to claim 3, wherein said worktable has two stop bolts mounted to said first rail and upwardly projecting into said channel bar.

5. The adjustable working area cutting machine according to claim 4, wherein each said limiter has a screw bolt; said limiters are limited by selective engagement with said stop bolts such that a moving range of said movable guide rail unit relative to said first rail is limited.

6. The adjustable working area cutting machine according to claim 5, wherein each said limiter has a nut arranged in said channel bar and threaded onto the corresponding screw bolt.

7. The adjustable working area cutting machine according to claim 1, wherein said first rail of said worktable protrudes upwards.

8. The adjustable working area cutting machine according to claim 1, wherein said fence unit has a hand wheel mounted to said guide block, and a locking block pivotally connected to said guide block and driven by said hand wheel to selectively engage said second rail and to lock said fence unit to said worktable.

9. An adjustable working area cutting machine, comprising:
   a worktable having a first rail located on one lateral side thereof;
   a movable guide rail unit mounted to said first rail of said worktable, and having a channel bar coupled to said first rail and a second rail joined to one side of said channel bar and arranged in a parallel manner relative to said first rail;
   a fence unit having a fence arranged to be positioned at a top surface of said worktable and a guide block selectively movably engaged with said second rail;
   a locking member mounted to said first rail or to said channel bar of said movable guide rail unit and adapted for selectively engaging said channel bar of said movable guide rail unit or said first rail to selectively lock said movable guide rail unit to said first rail; and
   two limiters mounted to said channel bar or to said first rail for limiting a moving range of said movable guide rail unit relative to said first rail;
   wherein said channel bar has a length shorter than a length of said first rail.

10. The adjustable working area cutting machine according to claim 9, wherein said first rail of said worktable protrudes upwards.

11. The adjustable working area cutting machine according to claim 9, wherein said fence unit has a hand wheel mounted to said guide block, and a locking block pivotally connected to said guide block and driven by said hand wheel to selectively engage said second rail and to lock said fence unit to said worktable.

12. An adjustable working area cutting machine, comprising:
- a worktable having a first rail located on one lateral side thereof;
- a movable guide rail unit mounted to said first rail of said worktable, and having a channel bar coupled to said first rail and a second rail joined to one side of said channel bar and arranged in a parallel manner relative to said first rail;
- a fence unit having a fence arranged to be positioned at a top surface of said worktable and a guide block selectively movably engaged with said second rail; and
- a locking member mounted to said first rail or to said channel bar of said movable guide rail unit and adapted for selectively engaging said channel bar of said movable guide rail unit or selectively engaging said first rail to selectively lock said movable guide rail unit to said first rail;
- wherein said fence unit has a hand wheel mounted to said guide block, and a locking block pivotally connected to said guide block and driven by said hand wheel to selectively engage said second rail and to lock said fence unit to said worktable; and
- wherein said channel bar has a length shorter than a length of said first rail.

13. The adjustable working area cutting machine according to claim 12, further comprising two limiters mounted to said channel bar or to said first rail for limiting a moving range of said movable guide rail unit relative to said first rail, wherein said two limiters are respectively mounted at two distal ends of said channel bar.

14. The adjustable working area cutting machine according to claim 13, wherein said worktable has two stop bolts mounted to said first rail and upwardly projecting into said channel bar.

15. The adjustable working area cutting machine according to claim 14, wherein each said limiter has a screw bolt; said limiters are limited by selective engagement with said stop bolts such that a moving range of said movable guide rail unit relative to said first rail is limited.

16. The adjustable working area cutting machine according to claim 15, wherein each said limiter has a nut arranged in said channel bar and threaded onto the corresponding screw bolt.

17. The adjustable working area cutting machine according to claim 12, wherein said first rail of said worktable protrudes upwards.

18. An adjustable working area cutting machine, comprising:
- a worktable having a first rail located on one lateral side thereof;
- a movable guide rail unit mounted to said first rail of said worktable, and having a channel bar coupled to said first rail and a second rail joined to one side of said channel bar and arranged in a parallel manner relative to said first rail;
- a fence unit having a fence arranged to be positioned at a top surface of said worktable and a guide block selectively movably engaged with said second rail;
- a locking member mounted to said first rail or to said channel bar of said movable guide rail unit and adapted for selectively engaging said channel bar of said movable guide rail unit or said first rail to selectively lock said movable guide rail unit to said first rail; and
- two limiters mounted to said channel bar or to said first rail for limiting a moving range of said movable guide rail unit relative to said first rail;
- wherein said two limiters are respectively mounted at two distal ends of said channel bar; and
- wherein said locking member is mounted to said first rail and extends upwardly for selective engagement with said channel bar.

19. The adjustable working area cutting machine according to claim 18, wherein said worktable has two stop bolts mounted to said first rail and upwardly projecting into said channel bar.

20. The adjustable working area cutting machine according to claim 18, wherein said first rail of said worktable protrudes upwards.

21. An adjustable working area cutting machine, comprising:
- a worktable having a first rail located on one lateral side thereof;
- a movable guide rail unit mounted to said first rail of said worktable, and having a channel bar coupled to said first rail and a second rail joined to one side of said channel bar and arranged in a parallel manner relative to said first rail;
- a fence unit having a fence arranged to be positioned at a top surface of said worktable and a guide block selectively movably engaged with said second rail; and
- a locking member mounted to said first rail or to said channel bar of said movable guide rail unit and adapted for selectively engaging said channel bar of said movable guide rail unit or selectively engaging said first rail to selectively lock said movable guide rail unit to said first rail; and
- two limiters mounted to said channel bar or to said first rail for limiting a moving range of said movable guide rail unit relative to said first rail, wherein said two limiters are respectively mounted at two distal ends of said channel bar; and
- wherein said fence unit has a hand wheel mounted to said guide block, and a locking block pivotally connected to said guide block and driven by said hand wheel to selectively engage said second rail and to lock said fence unit to said worktable.

22. The adjustable working area cutting machine according to claim 21, wherein said worktable has two stop bolts mounted to said first rail and upwardly projecting into said channel bar.

23. The adjustable working area cutting machine according to claim 21, wherein said first rail of said worktable protrudes upwards.

* * * * *